(12) United States Patent
Xu et al.

(10) Patent No.: US 12,373,970 B2
(45) Date of Patent: Jul. 29, 2025

(54) SYSTEM AND METHOD FOR CONTROLLING PASSIVE INFRARED SENSORS, AND ELECTRONIC DEVICE

(71) Applicant: SHENZHEN SNC OPTO ELECTRONIC CO., LTD, Shenzhen (CN)

(72) Inventors: Jianyong Xu, Shenzhen (CN); Anle Zhao, Shenzhen (CN); Zhengwen Huang, Shenzhen (CN)

(73) Assignee: SHENZHEN SNC OPTO ELECTRONIC CO., LTD, Shenzhen (CN)

( * ) Notice: Subject to any disclaimer, the term of this patent is extended or adjusted under 35 U.S.C. 154(b) by 394 days.

(21) Appl. No.: 18/083,597

(22) Filed: Dec. 19, 2022

(65) Prior Publication Data
US 2024/0046496 A1    Feb. 8, 2024

(30) Foreign Application Priority Data
Aug. 5, 2022   (CN) .......................... 202210942929.0

(51) Int. Cl.
 G06K 9/00     (2022.01)
 G06T 7/00     (2017.01)
 G06T 7/586    (2017.01)
(52) U.S. Cl.
 CPC ............ *G06T 7/586* (2017.01); *G06T 7/0012* (2013.01); *G06T 2207/10048* (2013.01)

(58) Field of Classification Search
 CPC .................. G06T 7/586; G06T 7/0012; G06T 2207/10048; H05B 47/19; H05B 47/13; Y02B 20/40
 See application file for complete search history.

(56) References Cited

U.S. PATENT DOCUMENTS

| | | | |
|---|---|---|---|
| 10,013,861 B2* | 7/2018 | Fadell | G08B 21/22 |
| 10,209,124 B2* | 2/2019 | Monaci | G08B 13/19 |
| 10,776,672 B2* | 9/2020 | Doumbouya | A61B 5/746 |
| 11,417,002 B2* | 8/2022 | Wang | G06V 40/10 |
| 11,632,524 B2* | 4/2023 | Ryan | G06F 18/23 |
| | | | 348/143 |

(Continued)

FOREIGN PATENT DOCUMENTS

| | | | | |
|---|---|---|---|---|
| JP | 2007164506 A | * | 6/2007 | G08C 23/04 |
| JP | 2009043136 A | * | 2/2009 | G08B 13/19 |
| JP | 4966177 B2 | * | 7/2012 | G08B 13/196 |

*Primary Examiner* — Shervin K Nakhjavan (57) ABSTRACT

A method for controlling passive infrared sensors includes obtaining a three-dimensional image of a space to be laid out; arranging a plurality of PIR sensors and a plurality of sensor lamps on the three-dimensional image, a distance L between each adjacent two PIR sensors is equal to or less than a sensing radius of the PIR sensor; connecting each PIR sensor to a wireless network including a plurality of wireless sub-networks, each wireless sub-network includes four PIR sensors and at least one sensor lamp; controlling the four PIR sensors to sense living bodies in pairs every detection period, and when sensing data of living body is fed back, determining that there is at least one living body in the wireless sub-network; and determining a working state of the sensor lamp according to whether there is at least one living body in the wireless sub-network.

18 Claims, 6 Drawing Sheets

(56) References Cited

U.S. PATENT DOCUMENTS

| | | | |
|---|---|---|---|
| 2013/0229518 A1* | 9/2013 | Reed | H04N 23/74 348/148 |
| 2016/0292515 A1* | 10/2016 | Jia | B66B 1/2408 |
| 2021/0290976 A1* | 9/2021 | Maxik | A61N 5/0624 |
| 2021/0353806 A1* | 11/2021 | Maxik | A61L 2/24 |

* cited by examiner

SYSTEM AND METHOD FOR CONTROLLING PASSIVE INFRARED SENSORS, AND ELECTRONIC DEVICE

TECHNICAL FIELD

The subject matter herein generally relates to sensor technology, and particularly to a system and a method for controlling passive infrared sensors, and an electronic device.

BACKGROUND

Multiple lamps are usually arranged when designing the layout of lamps with the passive infrared (PIR) sensor, and the lamp usually has functions of PIR sensing and the natural light sensing, accordingly, corresponding light controllers and PIR sensors are required to be arranged on the lamps, respectively, to realize the functions of automatic light-on and automatic light-off of the sensor lamp. The light controller can control the sensor lamp to automatically turn off in the daytime and turn on at night according to the brightness of the ambient light. The PIR sensor can automatically turn on the sensor lamp when detecting that there is a human body moving near the sensor lamp, after the sensor lamp is turned on for a period of time, if no movement of the human body or object is detected, the sensor lamp will be turned off automatically. The dimmer can be wirelessly connected with the application of the smart device of the user, and remotely control dimming and switching of the sensor lamp. However, the PIR sensor intelligently executes the relevant program according to the configured parameters, if the parameters of each PIR sensor are required to be rewritten, the program is required to be updated. The update of the parameter or program is usually performed through the point-to-point controller or wired connection, which may lead to a large workload, the number of point-to-point connections is small, and the device that is far away from the connection point may easily lose connection.

In addition, if any PIR sensor in the wireless network is blocked or damaged, the sensing at this time will be inaccurate, which may result in failure to sense in time and achieve continuous lighting.

SUMMARY

A method for controlling passive infrared sensors is provided to solve the problem that the PIR sensor in the wireless network cannot perform detection in time when the PIR sensor is abnormal.

For realizing the above purpose, the method for controlling passive infrared sensors applied to lamp control, the method includes: obtaining a three-dimensional image of a space to be laid out; arranging a plurality of PIR sensors and a plurality of sensor lamps on the three-dimensional image, a distance L between each adjacent two of the plurality of the PIR sensors being equal to or less than a sensing radius of each of the plurality of the PIR sensor; connecting each of the plurality of PIR sensors to a wireless network, the wireless network includes a plurality of wireless sub-networks, and each of the plurality of the wireless includes four of the plurality of the PIR sensors and at least one of the plurality of sensor lamps; controlling the four of the plurality of PIR sensors to sense living bodies in pairs by using a time-sharing method every detection period, and in responses that sensing data of living body is fed back, determining that there is at least one living body in the current wireless sub-network; and determining a working state of the at least one of the plurality of sensor lamps in each of the plurality of the wireless sub-networks according to whether there is at least one living body in the wireless sub-network.

Optionally, the four of the plurality of the PIR sensors in each of the plurality of the wireless sub-networks are distributed in a rectangular shape in an arrangement plane.

Optionally, controlling the four of the plurality of PIR sensors to sense living bodies in pairs includes: determining each two of the four of the plurality of PIR sensors on a same side of a rectangle to be a PIR subgroup; and controlling the PIR subgroup in a same wireless network to sense the living bodies at a same time.

Optionally, the method further includes: obtaining four groups of sensing data of living body in the same wireless sub-network in one detection period.

Optionally, PIR subgroups in a detection state in adjacent two of the plurality of the wireless sub-networks do not overlap at the same time.

Optionally, the PIR subgroups in the detection state in the adjacent two of the plurality of the wireless sub-networks are located on opposite sides of the rectangle in a corresponding one of the wireless sub-networks at the same time.

Optionally, the method further includes: determining a working state of each of the four PIR sensors in each of the plurality of the wireless sub-networks according to a quantity of sensing data of living body fed back in the detection period.

Optionally, determining the working state of each of the four PIR sensors in each of the plurality of the wireless sub-networks according to the quantity of the sensing data of the living body fed back in the detection period includes: obtaining an IP address of one of the four PIR sensors to be controlled in the wireless network; determining the IP address of the one of the PIR sensors that has obtained the sensing data of the living body in the detection period according to feedback sensing data of the living body, and determining one of the plurality of the wireless sub-network to which the one of the PIR sensors that has obtained the sensing data of the living body belongs according to the IP address; and in response that the quantity of the sensing data of the living body in the same one of the plurality of the wireless sub-networks in the detection period is less than four, determining that the working state of at least one of the four PIR sensor in each of the plurality of the wireless sub-networks is abnormal.

Optionally, at least one ambient light sensor is arranged in each of the plurality of the wireless sub-networks, determining the working state of the at least one of the plurality of sensor lamps in each of the plurality of the wireless sub-network according to whether there is at least one living body in the wireless sub-network includes: in response that there is at least one living body in the wireless sub-network, and illuminance of ambient light detected by the at least one ambient light sensor is less than a preset value, turning on the sensor lamp in a corresponding one of the plurality of the wireless sub-networks.

For realizing the above purpose, an electronic device is provided, which is applied to lamp control, the electronic device includes: at least one processor; and a storage device coupled to the at least one processor and storing instructions for execution by the at least one processor to cause the at least one processor to: obtain a three-dimensional image of a space to be laid out; arrange a plurality of PIR sensors and a plurality of sensor lamps on the three-dimensional image, a distance L between each two adjacent of the plurality of the PIR sensors being equal to or less than a sensing radius of each of the plurality of the PIR sensor; connect each of the plurality of PIR sensors to a wireless network, the wireless network includes a plurality of wireless sub-networks, and each of the plurality of the wireless includes four of the plurality of the PIR sensors and at least one of the plurality of sensor lamps; control the four of the plurality of PIR sensors to sense living bodies in pairs by using a time-sharing method every detection period, and in responses that sensing data of living body is fed back, determine that there is at least one living body in the current wireless sub-network; and determine a working state of the at least one of the plurality of sensor lamps in each of the plurality of the wireless sub-networks according to whether there is at least one living body in the wireless sub-network.

Optionally, the four of the plurality of the PIR sensors in each of the plurality of the wireless sub-networks are distributed in a rectangular shape in an arrangement plane.

Optionally, the at least one processor is further caused to: determine each two of the four of the plurality of PIR sensors on a same side of a rectangle to be a PIR subgroup; and control the PIR subgroup in a same wireless network to sense the living bodies at a same time.

Optionally, the at least one processor is further caused to: obtain four groups of sensing data of living body in the same wireless sub-network in one detection period.

Optionally, PIR subgroups in a detection state in adjacent two of the plurality of the wireless sub-networks do not overlap at the same time.

Optionally, the PIR subgroups in the detection state in the adjacent two of the plurality of the wireless sub-networks are located on opposite sides of the rectangle in a corresponding one of wireless sub-networks at the same time.

Optionally, the at least one processor is further caused to: determine a working state of each of the four PIR sensors in each of the plurality of the wireless sub-networks according to a quantity of sensing data of living body fed back in the detection period.

Optionally, the at least one processor is further caused to: obtain an IP address of one of the four PIR sensors to be controlled in the wireless network; determine the IP address of the one of the PIR sensors that has obtained the sensing data of the living body in the detection period according to feedback sensing data of the living body, and determine one of the plurality of the wireless sub-network to which the one of the PIR sensors that has obtained the sensing data of the living body belongs according to the IP address; and in response that the quantity of the sensing data of the living body in the same one of the plurality of the wireless sub-networks in the detection period is less than four, determine that the working state of at least one of the four PIR sensors in each of the plurality of the wireless sub-network is abnormal.

Optionally, at least one ambient light sensor is arranged in each of the plurality of the wireless sub-networks, the at least one processor is further caused to: in response that there is at least one living body in the wireless sub-network, and illuminance of ambient light detected by the at least one ambient light sensor is less than a preset value, turn on the sensor lamp in a corresponding one of the plurality of the wireless sub-networks.

For realizing the above purpose, a computer-readable storage medium is provided, which is applied to lamp control, the computer-readable storage medium has instructions stored thereon, when the instructions are executed by a processor of an electronic device, the processor is configured to perform a method for controlling passive infrared sensors, the method includes: obtaining a three-dimensional image of a space to be laid out; arranging a plurality of PIR sensors and a plurality of sensor lamps on the three-dimensional image, a distance L between each two adjacent of the plurality of the PIR sensors being equal to or less than a sensing radius of each of the plurality of the PIR sensor; connecting each of the plurality of PIR sensors to a wireless network, the wireless network includes a plurality of wireless sub-networks, and each of the plurality of the wireless includes four of the plurality of the PIR sensors and at least one of the plurality of sensor lamps; controlling the four of the plurality of PIR sensors to sense living bodies in pairs by using a time-sharing method every detection period, and in responses that sensing data of living body is fed back, determining that there is at least one living body in the current wireless sub-network; and determining a working state of the at least one of the plurality of sensor lamps in each of the plurality of the wireless sub-networks according to whether there is at least one living body in the wireless sub-network.

For realizing the above purpose, a system for controlling passive infrared sensors is provided, which is applied to lamp control, the system includes: a plurality of PIR sensors; a plurality of sensor lamps; and a plurality of ambient light sensors; the plurality of the PIR sensors, the plurality of the sensor lamps, and the plurality of the ambient light sensors are arranged in a wireless network, a distance L between each adjacent two of the plurality of the PIR sensors is equal to or less than a sensing radius of each of the plurality of the PIR sensors; the wireless network includes a plurality of wireless sub-networks, and each of the plurality of the wireless sub-networks includes four of the plurality of PIR sensors, at least one of the plurality of sensor lamps, and at least one of the plurality of ambient light sensors; controlling the four of the plurality of PIR sensors to sense living bodies in pairs by using a time-sharing method every detection period, and in responses that sensing data of living body is fed back, determining that there is at least one living body in the current wireless sub-network; determining a working state of the at least one of the plurality of sensor lamps in each of the plurality of the wireless sub-networks according to whether there is at least one living body in the wireless sub-network and illuminance of ambient light.

BRIEF DESCRIPTION OF THE DRAWINGS

In order to clearly explain technical solutions of embodiments of the present disclosure or in the related art, drawings used in the description of the embodiments or the related art are briefly described below. Obviously, the drawings as described below are merely some embodiments of the present disclosure. Based on these drawings, other drawings can be obtained by those skilled in the art without paying creative efforts.

DETAILED DESCRIPTION

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may have presented methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skilled in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The terms "first", "second" and the like used in the embodiments of the present disclosure do not represent any order, quantity or importance, but are merely used to distinguish among different components. The terms "include", "contain" or the like mean that elements or articles appearing before the words cover elements or articles listed after the words and their equivalents, without excluding other elements or articles. The terms "connect", "link" or the like are not limited to physical or mechanical connection, but may include electrical connection, whether direct or indirect.

In order to solve the problem in the prior art that the PIR sensor in the wireless network cannot sense in time when the PTR sensor is abnormal, a method for controlling the PTR sensor is provided. It should be noted that the method for controlling the PIR sensor is mainly applied to control a sensor lamp.

Figure 1:
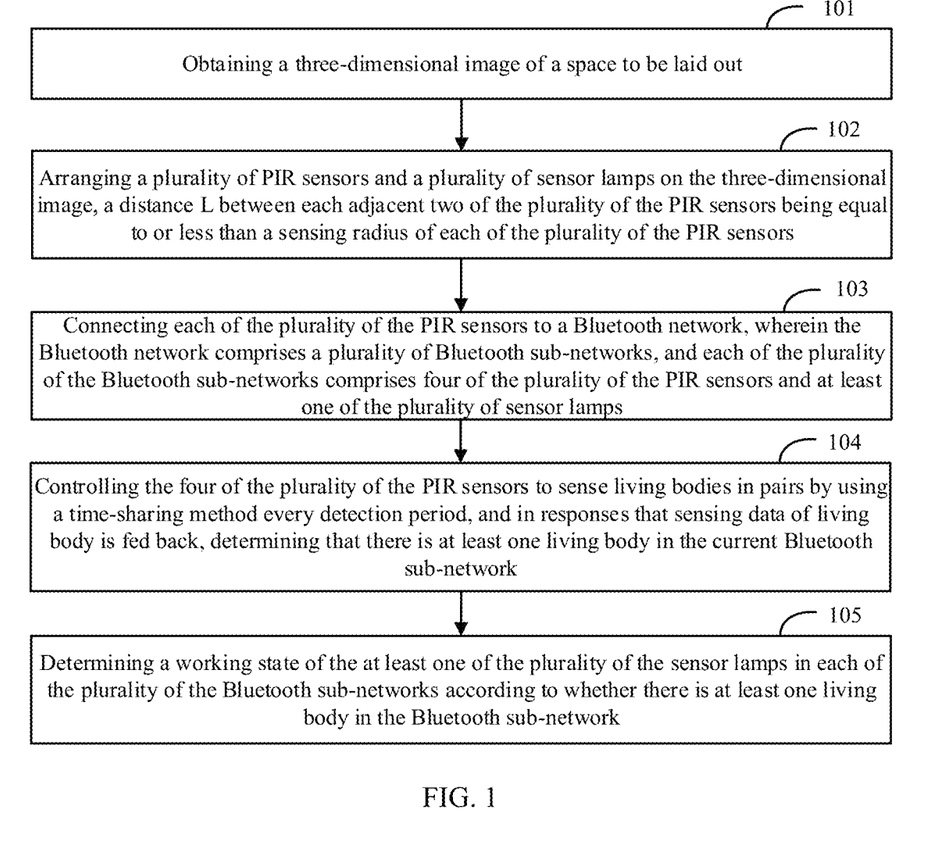
FIG. 1 illustrates a flowchart of an embodiment of a method for controlling PIR sensors according to the present disclosure.

FIG. 1 illustrates a flowchart of an embodiment of a method for controlling PIR sensors, the method is applied to lamp control. The method is provided by way of example, as there are a variety of ways to carry out the method. Each block shown in FIG. 1 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 101.

At block 101, obtaining a three-dimensional image of a space to be laid out.

In one embodiment, the space to be laid out is a space where the PIR sensors are required to be arranged, and the three-dimensional image is an image of the space, which has attribute of three-dimensional coordinate, and can be obtained by performing three-dimensional modeling after data measurement.

At block 102, arranging a plurality of PIR sensors and sensor lamps on the three-dimensional image, and a distance L between each two adjacent PIR sensors is equal to or less than a sensing radius of the PIR sensor.

Figure 2:
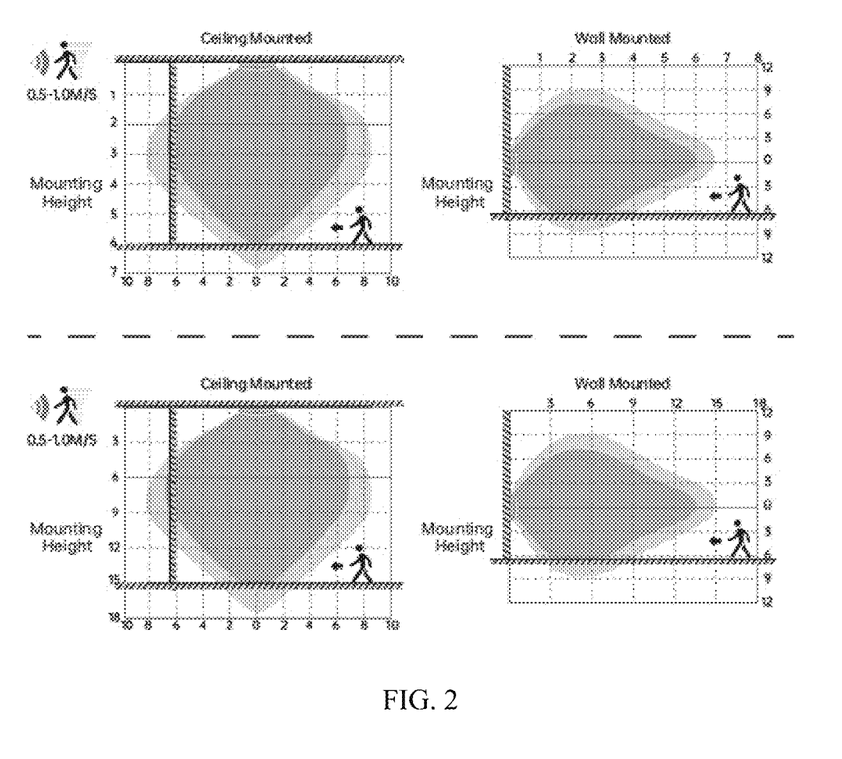
FIG. 2 is a schematic view of an embodiment of sensing ranges of the PIR sensor in different arrangement states according to the present disclosure.

In one embodiment, arranging a plurality of PIR sensors and sensor lamps on the three-dimensional image is simulated in a three-dimensional simulation software. A sensing range and a sensing area of each PIR sensor are the same. When each PIR sensor is not blocked and the working state of each PIR sensor is normal, the ideal sensing ranges corresponding to different arrangement states such as ceiling-mounted arrangement and wall-mounted arrangement are shown in FIG. 2, and the height change of arrangement will also affect the sensing area. The stereo sensing range of the PR sensor can be limited in the three-dimensional simulation software, thus, simulated arrangement is more accurate. In one embodiment, the sensor lamp can be an LED sensor lamp.

At block 103, connecting each PIR sensor to a wireless network, the wireless network includes a plurality of wireless sub-networks, and four PIR sensors and at least one sensor lamp are connected with each of the plurality of wireless sub-networks, that is, each wireless sub-network includes four PIR sensors and at least one sensor lamp. The wireless network may be a Bluetooth network, and the wireless sub-networks may be Bluetooth sub-networks.

Figure 3:
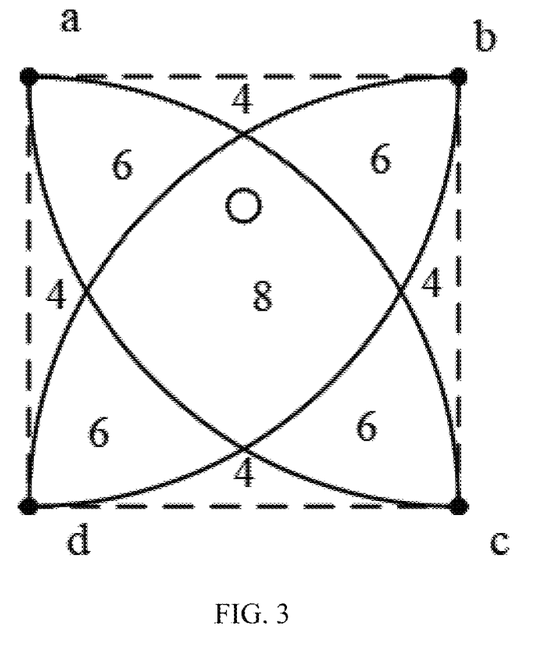
FIG. 3 is a schematic view of an embodiment of a measurement range of a wireless sub-network in a wireless network in the method for controlling PIR sensors according to the present disclosure.

In one embodiment, the wireless network is established based on wireless 4.0, and the underlying layer is wireless Low Energy (BLE), the wireless network adopts three broadcast channels of BLE for data interaction. When the four PIR sensors and the at least one sensor lamp are connected with the wireless sub-network, each wireless sub-network has a detection range. Referring to FIG. 3, the detection range is an area selected by a dotted box, in actual design, the detection range can completely cover the area having movement of living body. Since the distance L between each two adjacent PIR sensors has been previously defined to be equal to or less than the sensing radius of the PIR sensor, in the sensing area between the PIR sensors and the ground, at least two PIR sensors in the wireless network can detect an area. Thus, when a PIR sensor is damaged, the adjacent PIR sensor can realize supplementary detection.

At block 104, controlling the four PIR sensors to sense the living bodies in pairs by using a time-sharing method every detection period, and if sensing data of living body is fed back, determining that there is at least one living body in the current wireless sub-network.

As illustrated in FIG. 3, the four PIR sensors are named as a, b, c, and d, respectively, and the wireless network is actually the part selected by the dotted box, and during actual detection, the four PIR sensors in each detection period can be grouped arbitrarily without repetition, for example, the four PIR sensors can be grouped into ab, cd, ad, and cb, and perform the detection in pairs, to achieve supplementary detection in a direction, and the time-sharing detection can achieve another supplementary detection, thereby avoiding the possibility that a PTR sensor is unable to detect when being blocked or damaged by comparing with the two detection results (i.e., the results of the detection in pairs and the time-sharing detection).

At block 105, determining a working state of the sensor lamp in the wireless sub-network according to whether there is at least one living body in the wireless sub-network.

In one embodiment, the sensing ranges of the PIR sensors after being networked can fully cover the range to be detected by using the wireless networking method. There may be a plurality of wireless sub-networks in the wireless network, and in each wireless sub-network, the distance L between every two adjacent PTR sensors is equal to or less than the sensing radius of the PIR sensor, so that at least two PIR sensors can detect an area. Thus, when a certain PTR sensor is damaged, the adjacent PTR sensor can realize the supplementary detection. Through the time-sharing detection, double detection can be further realized to ensure the accuracy of the detection results, and to avoid the possibility that the living body cannot be detected when the living body is in a dead angle or a certain PIR sensor is blocked or damaged. Thus, the technical problem that the PTR sensor in the wireless network in the prior art cannot sense the living body in time when the PTR sensor is abnormal is solved. In addition, since the sensing ranges of the PTR sensors in the wireless sub-network are interleaved, the working state of the sensor lamp in the wireless sub-network can also be determined according to whether there is at least one living body in the wireless sub-network.

In one embodiment, the four PIR sensors in each of the wireless sub-networks are distributed in a rectangular shape in an arrangement plane. Thus, the sensing area of the PTR sensor is more regular, and it is convenient to arrange the PTR sensors in corridors, rooms, workshops, or other areas, and is convenient for regular wiring.

In one embodiment, controlling the four PTR sensors to sense the living body in pairs by using a time-sharing method every detection period includes: determining each two PTR sensors on a same side of a rectangle to be a PIR subgroup, and controlling one of the PTR subgroups in the same wireless network to sense the living body at a same time.

Since the rectangle has four sides, the rectangle has four PIR subgroups. As illustrated in FIG. 3, the PIR subgroups may be ab\ad\dc\bc. Through the time-sharing detection after being grouped, it can be ensured that at any time, at least two PTR sensors detect the living body in any area of the range to be detected. The above grouping method can ensure that each PTR sensor is traversed twice, thereby avoiding the possible overlapping of the sensing ranges of other grouping methods, and ensuring that the sensing ranges of the PTR sensors evenly cover the range to be detected during each time-sharing detection.

It should be noted that the above grouping method is only one of the grouping methods, the four PTR sensors can also be grouped according to a diagonal line of the rectangle, or other grouping methods are also possible, as long as it is can be ensured that each PTR sensor is traversed twice. In order to improve the accuracy, in each detection period, the traversal time of each PIR sensor can also be increased. It should be noted that the feedback sensing data after being grouped includes at least one living body being detected or no living body being detected, the result of detection in pairs includes the current PIR subgroup detecting the living body twice, once, or zero.

In one embodiment, the method further includes: obtaining four groups of sensing data of living body in the same wireless sub-network in each detection period.

The detection period is set according to the sensing accuracy and sensing time of the PIR sensor, and is generally set to be as short as possible to ensure that the living body is always within the range to be detected covered by the wireless sub-network during the detection period. The four groups of sensing data of living body include the data sensed twice by each PIR sensor at different time. In one embodiment, at the same time, the PIR subgroups in the detection state in two adjacent wireless sub-networks do not overlap.

Figure 4:
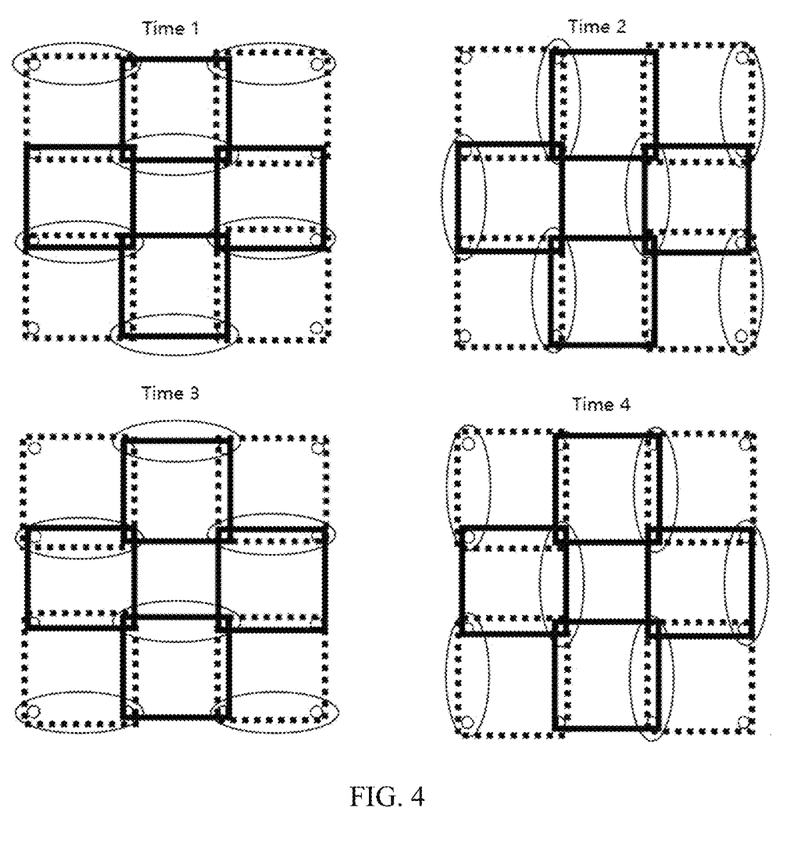
FIG. 4 is a schematic view of an embodiment of states of time measurement of the wireless network in the method for controlling PIR sensors according to the present disclosure.

Referring to FIG. 4, in each detection period, there are four times, at each time, only the circled PIR subgroup performs the detection, in this way, while ensuring full coverage of the detection, the PIR sensors in the two adjacent wireless sub-networks do not conflict, which is convenient to count the detection results in each wireless sub-network and the working state of the PIR sensor.

It should be noted that there may be a situation that the PIR subgroup in the detection state in the two adjacent wireless sub-networks detects the living body in another wireless sub-network. For example, at time 1, the PIR subgroup in the detection state in the first wireless sub-network in the first row detects the area located in the left of the arc ac and the arc db in the second wireless sub-network in the first row, the detection result in the first wireless sub-network includes detecting the living body once, the detection result in the second wireless sub-network includes detecting the living body twice. If the number of living body in the wireless network is 1, it is determined that the living body is in the second wireless sub-network. If the number of living bodies in the wireless network is N, it is assumed that there is a living body in the first wireless sub-network, and there is a living body in the second wireless sub-network, it is determined whether there is at least one living body in the first wireless sub-network and the working state of the first wireless sub-network according to the detection results in the first wireless sub-network, and the detection results in the second wireless sub-network in the subsequent time 2, 3, and 4.

Optionally, at the same time, the PIR subgroups in the detection state in the two adjacent wireless sub-networks are located on opposite sides of the rectangle in the corresponding wireless sub-network. The PIR subgroups being located on the opposite sides can ensure that the detection results in the two adjacent wireless sub-networks are different, so as to assist the judgment as much as possible when it is impossible to distinguish which detection area the living body is in.

Optionally, the method further includes: determining the working state of each PIR sensor in the wireless sub-network according to the quantity of sensing data of living body fed back in the detection period. The PIR sensor may be damaged or blocked. If no living body is detected, there may be no living body or the PIR sensor may be damaged or blocked.

Further, at least twice detection can also determine which area of the living body is in the range to be detected. As illustrated in FIG. 3, the sensing range of the PTR sensor is set to a circle by default, and the detection range covered by the sensing range is a rectangular range formed by the PIR sensors a, b, c, and d. The area numbered 4 indicates that the sensing ranges of two PIR sensors overlap, the area numbered 3 indicates that the sensing ranges of three PIR sensors overlap, and the area numbered 8 indicates that the sensing ranges of four PIR sensors overlap.

Optionally, determining the working state of each PIR sensor in the wireless sub-network according to the quantity of sensing data of living body fed back in the detection period includes: obtaining the IP address of the PIR sensor to be controlled in the wireless network; determining the IP address of the PTR sensor that has obtained the sensing data of living body in the detection period according to the feedback sensing data of living body, and determining the wireless sub-network to which the PTR sensor that has obtained the sensing data of living body belongs according to the IP address; in the detection period, if the quantity of sensing data of living body obtained in the same wireless sub-network is less than four, determining that at least one PTR sensor in the wireless sub-network is in an abnormal working state.

In one embodiment, the IP address is set in the process of establishing the wireless network, and the node in the wireless network is the PTR sensor, the PTR sensor can be connected with any other PIR sensor in the wireless network. The PR sensors with similar spatial distances are used as adjacent nodes for networking.

As illustrated in FIG. 3, the sensing range of the PIR sensor is set to a circle by default, and the detection range covered by the sensing range is a rectangular range formed by the PTR sensors a, b, c, and d. The area numbered 4 indicates that the sensing ranges of two PIR sensors overlap, the area numbered 3 indicates that the sensing ranges of three PTR sensors overlap, and the area numbered 8 indicates that the sensing ranges of four PTR sensors overlap. In a detection period, if the quantity of sensing data of living body obtained in the same wireless sub-network is less than four, it is determined that at least one PIR sensor in the wireless sub-network is in the abnormal working state. Therefore, the above method can quickly determine the working state of the PIR sensor in the corresponding wireless sub-network, the working state of the PIR sensor in the wireless sub-network can be accurately determined while the rapid detection is achieved. In this detection method, although it relies on the IP address of the PIR sensor for classification, in the process of subsequent acquisition of sensing data of living body, the IP address is only used as a standard for dividing a sub-network, and is used to obtain the sensing data of living body in each sub-network. Therefore, the above determination process is not required complex calculations, and can quickly determine whether there is a PIR sensor in an abnormal working state in the current wireless sub-network only based on one determination condition. Since the detection range is determined at this time, accurate detection and accurate judgment of the working state of the PIR sensor in the wireless sub-network can be achieved when the living body is in any area of the detection range. It should be noted that, the label of the wireless sub-networks selected by each frame in FIG. 4 refers to FIG. 3.

Optionally, at least one ambient light sensor is arranged in each wireless sub-network, that is, each wireless sub-network further includes the at least one ambient light sensor. Determining a working state of the sensor lamp in the wireless sub-network according to whether there is at least one living body in the wireless sub-network further includes: if it is determined that there is at least one living body in the wireless sub-network, and the illuminance of the ambient light detected by the at least one ambient light sensor is less than a preset value, turning on a corresponding sensor lamp in the wireless sub-network.

Optionally, turning on a corresponding sensor lamp in the wireless sub-network includes: controlling working parameters of the corresponding sensor lamp in the wireless sub-network according to the detection results of living body;

obtaining the IP address and working parameters of the sensor lamp to be turned on in the wireless sub-network;

In one embodiment, the hardware condition required for the wireless network is that the PIR sensor includes a wireless chip, and the IP address is required to be configured during arrangement. For example, the working parameters include one or more of a preset brightness level, a waiting dimming brightness level, a delay time, a light-on illuminance value, a light-off illuminance value, a waiting time, and a sensing range. It should be noted that, after the configuration is completed, the IP address of each PIR sensor can be obtained from the terminal device connected with the PIR sensor. The working parameters may be preset, or may be real-time updated by the user for the PIR sensor with any IP address.

determining a transmission path according to the IP address and a plurality of nodes in the wireless network;

In one embodiment, the node can be other PIR sensor, or can be some devices that are specially set, the node can be configured when the wireless network is established, the node can be a data transfer medium, which can achieve multiple different point-to-point simultaneous data transmission. The determined transmission path is not unique, signal transmission and parameter setting can be realized without the wireless network.

transmitting the working parameters to the sensor lamp corresponding to the IP address according to the transmission path, and the sensor lamp operates according to the working parameters;

In one embodiment, the signals composed of the working parameters is transmitted in the transmission path through the wireless network.

determining an update state of the working parameters by obtaining working data returned by the sensor lamp and the PIR sensor through the wireless network.

Through the PIR sensor and the wireless network of the sensor lamps, the wireless MESH network between sensors and multipoint to multipoint data transmission can be realized when updating the data, the cellular connection can implement the communication between the PIR sensor in the wireless network and the terminal device, thereby solving the problem of channel occupancy between a terminal device and multiple devices, the small number of connections, remote wireless that is not stable and easily lost connection, at the same time, the cellular connection supports terminal Internet upgrade of PIR sensor, the cellular connection can optimize and add functions in time, to realize the gradually rational control of lamps, and solve the technical problem that the PIR sensor in the wireless network cannot perform detection when the PIR sensor is abnormal.

Optionally, the working parameters include one or more of a preset brightness level, a waiting dimming brightness level, a delay time, a light-on illuminance value, a light-off illuminance value, a waiting time, and a sensing range.

Optionally, the preset brightness level is set to 100%; the time for the sensor lamp to light up during the power-on self-test is 50 s; the waiting dimming brightness level is set to 10%, 20%, 30%, or 50%; the delay time is set to 5 s, 30 s, 1 min, 2 min, 3 min, 5 min, 10 min, 15 min, 20 min, 25 min, 30 min, 45 min, 60 min, 90 min, or 120 min; the light-on illuminance value is set to 2 Lux, 10 Lux, 30 Lux, 50 Lux, 80 Lux, 120 Lux, 200 Lux, 250 Lux, 300 Lux, 350 Lux, 400 Lux, or Disable; the waiting time is set as 0 s, 5 s, 30 s, 1 min, 2 min, 3 min, 5 min, 10 min, 15 min, 20 min, 25 min, 30 min, 45 min, 60 min, or +∞; the sensing range is set to 25%, 50%, 75%, or 100%.

Optionally, the IP address of each PIR sensor and the sensor lamp is set when the PIR sensor is configured for the wireless network.

Optionally, a working process of the sensor lamp according to the working parameters after receiving the working parameters includes:

switching the PIR sensor in the wireless sub-network corresponding to the sensor lamp to a corresponding working mode according to the working parameters;

when the working mode is a light control priority mode, obtaining the illuminance of natural light when the sensor lamp is turned off;

when the illuminance of natural light is less than the light-on illuminance value, turning on the sensor lamp according to the illuminance of natural light;

when the illuminance of natural light is greater than the light-off illuminance value, turning off the sensor lamp.

In one embodiment, when the waiting time is set to +∞, the waiting brightness is 10%/20%/30%, and the light control illuminance value is 30 lx/50 lx/80 lx/120 lx, the PIR sensor enters the light control priority mode, the sensor lamp is in a turn-off state, when the illuminance of natural light is less than the light-on illuminance value, the output is turned on; when the illuminance of natural light is greater than the light-off illuminance value, the output is turned off.

After the PIR sensor enters the light control priority mode, the brightness of the sensor lamp maintain unchanged according to the preset waiting dimming brightness level, the illuminance of natural light, the light-on illuminance value, and the light-off illuminance value are judged respectively after 8 s. Alternatively, setting the light-on illuminance value for activating the light control function, the light-off illuminance value, and the waiting time to +∞, so that the PIR sensor integrated with wireless and light control enters the light control priority mode. The sensor lamp is in the turn-off state, when the illuminance of natural light is less than the light-on illuminance value, the output is turned on, the sensor lamp is lighted up from the waiting dimming brightness level to the preset brightness level. By setting the above parameters to enable the PIR sensor to enter different control modes, the states of wireless connection, light control, and PIR sensing can be switched by setting the work parameters through the terminal device, so that the control of the working state of each PIR sensor in the wireless network can be realized when the position, connection relationship, or wireless connection of the terminal device is not changed through the wireless, and multi-point settings can be realized at the same time.

Optionally, the working process of the sensor lamp according to the working parameters after receiving the working parameters includes:

switch the PIR sensor in the wireless sub-network where the sensor lamp is located to a corresponding working mode according to the working parameters;

when the working mode is a light control threshold mode, obtaining the illuminance of natural light when the sensor lamp is turned off;

when the illuminance of natural light is greater than the light-off illuminance value, not turning on the sensor lamp;

when the illuminance of natural light is less than the light-on illuminance value and at least one moving living body has been detected, turning on the sensor lamp;

when the illuminance of natural light is less than the turn-on illuminance value and no moving living body is detected, reducing the brightness of the sensor lamp according to the waiting dimming brightness level, and automatically turning off the sensor lamp after the waiting time expires.

In one embodiment, when the waiting time is not set to +∞, the PIR sensor enters the light control threshold mode, the sensor lamp is in the turn-off state, when the illuminance of natural light is greater than the light-off illuminance value, the output is not turned on, and when the illuminance of natural light is less than the light-on illuminance value and the movement of at least one human body or object has been detected, the output is turned on. In addition, the PIR sensor integrated with wireless and light control can enter the light control threshold mode by setting the light-on illuminance value for activating the light control function, the light-off illuminance value, and the waiting time being not set to +∞. The sensor lamp is in the turn-off state, when the illuminance of natural light is less than the light-on illuminance value and the movement of at least one human body or object has been detected, the output is turned on, and the sensor lamp is lighted up from the waiting dimming brightness level to the preset brightness level; if no movement of the human body or the object is detected within the set delay time, the brightness of the sensor lamp is reduced to the waiting dimming brightness level. In the light control priority mode, the sensor lamp maintains low brightness until the illuminance of natural light is greater than the turn-off illuminance value, the sensor lamp is automatically turned off, in the light control threshold mode, the sensor lamp is automatically turned off after the waiting time expires.

It should be noted that, in one embodiment, the PIR sensor and the sensor lamp can be set one-to-one, when adjusting the relevant mode, only the sensor lamp corresponding to the PIR sensor is required to be adjusted, and the sensor lamps in the entire wireless sub-network are not required to be adjusted, the adjustment principle refers to the adjustment principle of the wireless sub-network, which is not be repeated.

Based on the combination of the above embodiment and the previous embodiment, the PIR sensor integrated with wireless and light control, the wireless network of the sensor lamp, and the control method of the PIR sensor are provided. Through wireless connection, the APP of the terminal device can realize the remote control of lamps, especially the setting of basic parameters such as a dimming luminance, delay time, waiting time, sensing range, and illumination threshold of light control; the wireless MESH network between sensors and multipoint to multipoint data transmission can be realized when updating the data, the cellular connection can implement the communication between the PIR sensor in the wireless network and the terminal device, thereby solving the problem of channel occupancy between a terminal device and multiple devices, the small number of connections, remote wireless that is not stable and easily lost connection, at the same time, the cellular connection supports terminal Internet upgrade of PIR sensor, the cellular connection can optimize and add functions in time, to realize the gradually rational control of lamps.

When the PTR sensor equipped with the above control method is applied to the sensor lamp, the sensor lamp can be controlled to be automatically turned on, wait for dimming, and be automatically turned off, the sensor lamp has the advantages of intelligence and energy saving, good consistency, stable performance, and convenient arrangement.

Optionally, switching the sensor lamp to a corresponding working mode according to the working parameters includes:

when the waiting time is set to +∞, the waiting brightness is 10%/20%/30%, and the light control illumination value is 30 lx/50 lx/80 lx/120 lx, switching the PIR sensor to the light control priority mode;

when the waiting time is not set to +∞, switching the PIR sensor to the light control threshold mode.

Optionally, when the illuminance of natural light is less than the light-on illuminance value, turning on the sensor lamp according to the illuminance of natural light further includes:

when the illuminance of natural light is less than the light-on illuminance value, detecting whether at least one moving living body exists;

If no moving living body exists, controlling the sensor lamp to maintain the low brightness according to the waiting dimming brightness level until the illuminance of natural light is greater than the light-off illuminance value.

Optionally, the sensor lamp further includes a first photosensitive sensor and a second photosensitive sensor. The method further includes: obtaining the illuminance of natural light when the sensor lamp is turned on by the first photosensitive sensor; obtaining the illuminance of natural light when the sensor lamp is turned off by the second photosensitive sensor.

The luminance of natural light under different conditions is detected in real time by different detection devices, and special settings can be made for the first photosensitive sensor, thereby avoiding the interference of different environments on the detection result, and ensuring the accuracy of the detection information.

Optionally, the sensor lamp includes a single-chip microcomputer, a power conversion circuit, photosensitive sensors, a dimming circuit, and a receiving unit of remote control signals electrically connected with the single-chip microcomputer, respectively. The sensor lamp is further electrically connected with the PIR sensor.

In one embodiment, the PIR sensor can detect the movement of the human body or the object, and the single-chip microcomputer stores a program to realize the method for controlling the PIR sensor, the program can be used to control the automatic turn-on, waiting dimming, and automatic turn-off of the sensor lamp.

Optionally, the input end of the power conversion circuit is provided with three POGPIN conductive pins, and the three conductive pins includes +12V, and the positive and negative electrodes of DIM power dimming. The +12V conductive pin is connected with the +12V power supply end of the dimming circuit, and the 0-10V output end of the dimming circuit is connected with the DIM power supply dimming end.

Figure 5:
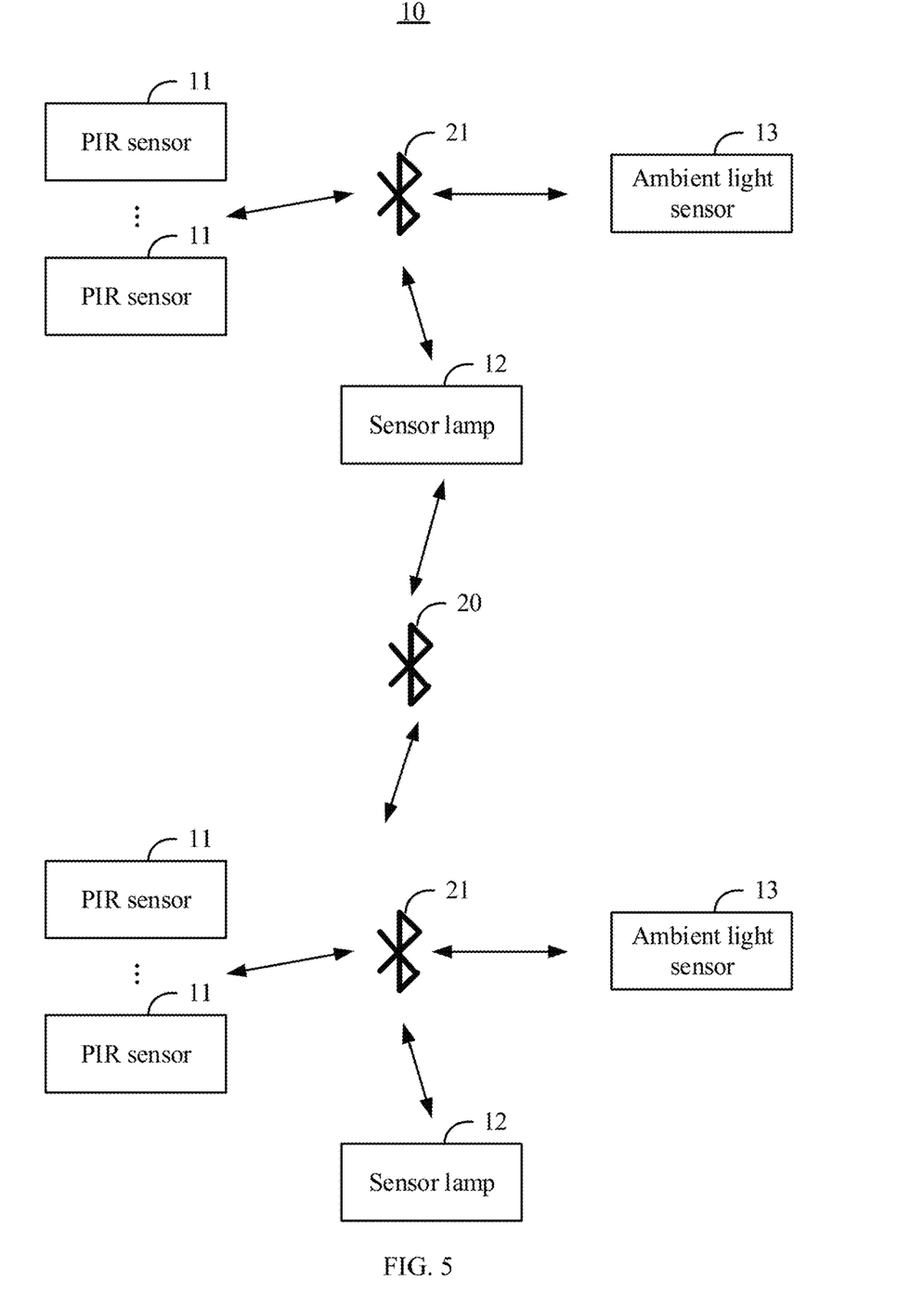
FIG. 5 is a schematic view of an embodiment of a system for controlling PIR sensors according to the present disclosure.

Referring to FIG. 5, in order to solve the above problems, a PIR sensor control system 10 is further provided, which is applied to lamp control. The PIR sensor control system 10 includes a plurality of PIR sensors 11, sensor lamps 12, and ambient light sensors 13 in the same wireless network 20, the distance L between each two adjacent PIR sensors is equal to or less than the sensing radius of the PIR sensor;

the wireless network 20 includes a plurality of wireless sub-networks 21, and each wireless sub-networks includes four PIR sensors, at least one sensor lamp, and at least one ambient light sensor;

controlling the four PIR sensors to sense the living body in pairs by using a time-sharing method every detection period, and if the sensing data of living body is fed back, determining that there is at least one living body in the current wireless sub-network;

determining a working state of the sensor lamp in the wireless sub-network according to whether there is at least one living body in the wireless sub-network and the illuminance of the ambient light.

In the above embodiment, the distance L between each two adjacent PIR sensors is equal to or less than the sensing radius of the PIR sensor; each PIR sensors is connected with the same wireless network, the wireless network includes a plurality of wireless sub-networks, and each wireless sub-networks includes four PIR sensors, at least one sensor lamp, and at least one ambient light sensor; controlling the four PIR sensors to sense the living body in pairs by using a time sharing method every detection period, and if the sensing data of living body is fed back, determining that there is at least one living body in the current wireless sub-network; determining a working state of the sensor lamp in the wireless sub-network according to whether there is at least one living body in the wireless sub-network and the illuminance of the ambient light. Through the above embodiment, when any PIR sensor in the wireless network is abnormal, other PR sensors can also detect the living body, and can determine the working state of the sensor lamp in the wireless sub-network according to whether there is at least one living body. While solving the technical problem in the prior art that the PTR sensor in the wireless network cannot sense the living body in time when an abnormality occurs, it can also determine the working state of the sensor lamp in the wireless sub-network.

Figure 6:
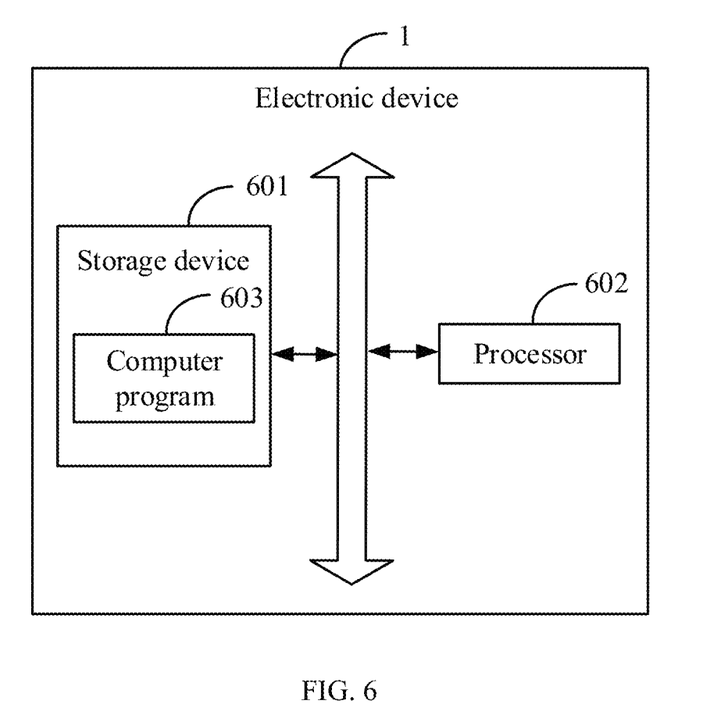
FIG. 6 is a schematic view of an embodiment of an electronic device according to the present disclosure.

FIG. 6 illustrates the electronic device 1 in one embodiment. The electronic device 1 includes, but is not limited to, a storage device 601, a processor 602, and a computer program 603. The electronic device 1 can be a computer that communicates with the PIR sensors and the sensor lamp. FIG. 6 illustrates only one example of the electronic device 1. Other examples can include more or fewer components than as illustrated or have a different configuration of the various components in other embodiments.

The processor 602 can be a central processing unit (CPU), a microprocessor, or other data processor chip that performs functions in the electronic device 1.

In one embodiment, the storage device 601 can include various types of non-transitory computer-readable storage mediums. For example, the storage device 601 can be an internal storage system, such as a flash memory, a random access memory (RAM) for the temporary storage of information, and/or a read-only memory (ROM) for permanent storage of information. The storage device 601 can also be an external storage system, such as a hard disk, a storage card, or a data storage medium.

The storage device 601 stores instructions, the processor 602 executes the computer program 603 stored in the storage device 601 for implementing the method for controlling passive infrared sensors provided in the embodiments of the present disclosure. The computer program 603 can be a PIR sensor control program and include instructions.

Upon execution of the instructions stores in the storage device 601, the processor 602 is configured to:

obtain a three-dimensional image of a space to be laid out;

arrange a plurality of PIR sensors and sensor lamps on the three-dimensional image, a distance L between each two adjacent PIR sensors being equal to or less than a sensing radius of the PIR sensor;

connect each of the plurality of PIR sensors to a wireless network, the wireless network comprising a plurality of wireless sub-networks, and four PIR sensors and at least one sensor lamp being connected with each of the plurality of wireless sub-networks;

control the four PIR sensors to sense living bodies in pairs by using a time-sharing method every detection period, and in responses that sensing data of living body is fed back, determining that there is at least one living body in the current wireless sub-network; and determine a working state of the sensor lamp in the wireless sub-network according to whether there is at least one living body in the wireless sub-network.

Technical features in the above embodiments can be combined arbitrarily. For concise description, not all possible combinations of the technical features in the above embodiments are described. However, any combination of the technical features described in the above embodiments should fall within the scope of the present disclosure, as long as no conflict occurs between the combined technical features.

The above embodiments, which are described in detail, are merely some implementations of the present disclosure, but they should not be construed to limit the scope of the present disclosure. It should be pointed out that, various modifications and improvements can be made by those skilled in the art without departing from the concept of the present disclosure. These modifications and improvements shall be encompassed by the protection scope of the present disclosure as defined by the appended claims.

What is claimed is:

1. A method for controlling passive infrared sensors, comprising:

obtaining a three-dimensional image of a space to be laid out;

arranging a plurality of PIR sensors and a plurality of sensor lamps on the three-dimensional image, a distance L between each adjacent two of the plurality of the PIR sensors being equal to or less than a sensing radius of each of the plurality of the PIR sensors;

connecting each of the plurality of the PIR sensors to a wireless network, wherein the wireless network comprises a plurality of wireless sub-networks, and each of the plurality of the wireless sub-networks comprises four of the plurality of the PIR sensors and at least one of the plurality of sensor lamps;

controlling the four of the plurality of the PIR sensors to sense living bodies in pairs by using a time-sharing method every detection period, and in responses that sensing data of living body is fed back, determining that there is at least one living body in the current wireless sub-network; and determining a working state of the at least one of the plurality of the sensor lamps in each of the plurality of the wireless sub-networks according to whether there is at least one living body in the wireless sub-network.

2. The method according to claim 1, wherein the four of the plurality of the PIR sensors in each of the plurality of the wireless sub-networks are distributed in a rectangular shape in an arrangement plane.

3. The method according to claim 2, wherein controlling the four of the plurality of PIR sensors to sense living bodies in pairs comprises:

determining each two of the four of the plurality of PIR sensors on a same side of a rectangle to be a PIR subgroup; and controlling the PIR subgroup in a same wireless network to sense the living bodies at a same time.

4. The method according to claim 3, further comprising:
obtaining four groups of sensing data of living body in the same wireless sub-network in one detection period.

5. The method according to claim 4, wherein PIR subgroups in a detection state in adjacent two of the plurality of the wireless sub-networks do not overlap at the same time.

6. The method according to claim 5, wherein the PIR subgroups in the detection state in the adjacent two of the plurality of the wireless sub-networks are located on opposite sides of the rectangle in a corresponding one of the wireless sub-networks at the same time.

7. The method according to claim 3, further comprising:
determining a working state of each of the four PIR sensors in each of the plurality of the wireless sub-networks according to a quantity of sensing data of living body fed back in the detection period.

8. The method according to claim 7, wherein determining the working state of each of the four PIR sensors in each of the plurality of the wireless sub-networks according to the quantity of the sensing data of the living body fed back in the detection period comprises:

obtaining an IP address of one of the four PIR sensors to be controlled in the wireless network;

determining the IP address of the one of the PIR sensors that has obtained the sensing data of the living body in the detection period according to feedback sensing data of the living body, and determining one of the plurality of the wireless sub-network to which the one of the PIR sensors that has obtained the sensing data of the living body belongs according to the IP address; and in response that the quantity of the sensing data of the living body in the same one of the plurality of the wireless sub-networks in the detection period is less than four, determining that the working state of at least one of the four PIR sensor in each of the plurality of the wireless sub-networks is abnormal.

9. The method according to claim 1, wherein at least one ambient light sensor is arranged in each of the plurality of the wireless sub-networks, wherein determining the working state of the at least one of the plurality of sensor lamps in each of the plurality of the wireless sub-network according to whether there is at least one living body in the wireless sub-network comprises:

in response that there is at least one living body in the wireless sub-network, and illuminance of ambient light detected by the at least one ambient light sensor is less than a preset value, turning on the sensor lamp in a corresponding one of the plurality of the wireless sub-networks.

10. An electronic device, comprising:
at least one processor; and
a storage device coupled to the at least one processor and storing instructions for execution by the at least one processor to cause the at least one processor to:

obtain a three-dimensional image of a space to be laid out;

arrange a plurality of PIR sensors and a plurality of sensor lamps on the three-dimensional image, a distance L between each two adjacent of the plurality of the PIR sensors being equal to or less than a sensing radius of each of the plurality of the PIR sensor;

connect each of the plurality of PIR sensors to a wireless network, wherein the wireless network comprises a plurality of wireless sub-networks, and each of the plurality of the wireless comprises four of the plurality of the PIR sensors and at least one of the plurality of sensor lamps;

control the four of the plurality of PIR sensors to sense living bodies in pairs by using a time-sharing method every detection period, and in responses that sensing data of living body is fed back, determine that there is at least one living body in the current wireless sub-network; and determine a working state of the at least one of the plurality of sensor lamps in each of the plurality of the wireless sub-networks according to whether there is at least one living body in the wireless sub-network.

11. The electronic device according to claim 10, wherein the four of the plurality of the PIR sensors in each of the plurality of the wireless sub-networks are distributed in a rectangular shape in an arrangement plane.

12. The electronic device according to claim 11, wherein the at least one processor is further caused to:

determine each two of the four of the plurality of PIR sensors on a same side of a rectangle to be a PIR subgroup; and control the PIR subgroup in a same wireless network to sense the living bodies at a same time.

13. The electronic device according to claim 12, wherein the at least one processor is further caused to:

obtain four groups of sensing data of living body in the same wireless sub-network in one detection period.

14. The electronic device according to claim 13, wherein PIR subgroups in a detection state in adjacent two of the plurality of the wireless sub-networks do not overlap at the same time.

15. The electronic device according to claim 13, wherein the PIR subgroups in the detection state in the adjacent two of the plurality of the wireless sub-networks are located on opposite sides of the rectangle in a corresponding one of wireless sub-networks at the same time.

16. The electronic device according to claim 11, wherein the at least one processor is further caused to:

determine a working state of each of the four PIR sensors in each of the plurality of the wireless sub-networks according to a quantity of sensing data of living body fed back in the detection period.

17. The electronic device according to claim 16, wherein the at least one processor is further caused to:

obtain an IP address of one of the four PIR sensors to be controlled in the wireless network;

determine the IP address of the one of the PIR sensors that has obtained the sensing data of the living body in the detection period according to feedback sensing data of the living body, and determine one of the plurality of the wireless sub-network to which the one of the PIR sensors that has obtained the sensing data of the living body belongs according to the IP address; and in response that the quantity of the sensing data of the living body in the same one of the plurality of the wireless sub-networks in the detection period is less than four, determine that the working state of at least one of the four PIR sensors in each of the plurality of the wireless sub-network is abnormal.

18. The electronic device according to claim 10, wherein at least one ambient light sensor is arranged in each of the plurality of the wireless sub-networks, the at least one processor is further caused to:

in response that there is at least one living body in the wireless sub-network, and illuminance of ambient light detected by the at least one ambient light sensor is less than a preset value, turn on the sensor lamp in a corresponding one of the plurality of the wireless sub-networks.

* * * * *